United States Patent
Honeycutt

(10) Patent No.: US 7,426,905 B2
(45) Date of Patent: Sep. 23, 2008

(54) LEASH RING

(75) Inventor: Donna L. Honeycutt, 300 W. McCoulskey, Terrell, TX (US) 75160

(73) Assignee: Donna L. Honeycutt, Terrell, TX (US)

( * ) Notice: Subject to any disclaimer, the term of this patent is extended or adjusted under 35 U.S.C. 154(b) by 89 days.

(21) Appl. No.: 11/462,805

(22) Filed: Aug. 7, 2006

(65) Prior Publication Data

US 2007/0044733 A1    Mar. 1, 2007

Related U.S. Application Data

(60) Provisional application No. 60/710,361, filed on Aug. 23, 2005.

(51) Int. Cl.
*A01K 1/06* (2006.01)

(52) U.S. Cl. ...................... 119/795; 119/788

(58) Field of Classification Search ............. 119/795, 119/780, 786, 787, 788, 791; 135/118
See application file for complete search history.

(56) References Cited

U.S. PATENT DOCUMENTS

| | | | |
|---|---|---|---|
| 648,263 A * | 4/1900 | Hull | ............ 239/268 |
| 1,563,212 A | 11/1925 | Madiar | |
| 3,678,903 A | 7/1972 | Ferraro | |
| 3,921,589 A * | 11/1975 | McGahee | ............ 119/786 |
| 4,546,730 A | 10/1985 | Holland | |
| 5,003,929 A | 4/1991 | Dean | |
| 5,174,246 A | 12/1992 | Driver | |
| D343,032 S | 1/1994 | Carrero | |
| 5,443,038 A | 8/1995 | Marino | |
| 5,462,019 A | 10/1995 | Hong-Rong et al. | |
| 5,950,569 A | 9/1999 | Perrulli | |
| 6,374,776 B2 | 4/2002 | Adair et al. | |
| 6,408,798 B1 | 6/2002 | Damme | |
| 6,851,393 B2 | 2/2005 | Bremm | |

* cited by examiner

Primary Examiner—Yvonne R. Abbott
(74) Attorney, Agent, or Firm—Michael A. O'Neil

(57) ABSTRACT

A leash ring comprises two side members which secure about a stationary object. The side members are pivotally secured together by a threaded fastener at the proximal ends thereof and retain a leash receiving member therebetween. The side members of the leash ring comprise teeth on the distal ends thereof for securing the side members together around a stationary object. The leash ring freely rotates about the stationary object thereby enabling free movement of a pet tethered thereto without entanglement.

1 Claim, 5 Drawing Sheets

LEASH RING

CROSS-REFERENCE TO RELATED APPLICATIONS

This application claims priority based on provisional patent application Ser. No. 60/710,361 filed Aug. 23, 2005, the entire content of which is incorporated herein by reference.

TECHNICAL FIELD

This invention relates generally to pet restraining devices, and more particularly to pet restraining leash rings which secure about a stationary object thereby facilitating movement of the restrained pet.

BACKGROUND AND SUMMARY OF THE INVENTION

Restraining pets outdoors has heretofore been challenging. Persons desiring to take their pet on trips, to sporting events, hunting, etc.; to have the companionship of their pet while working outdoors; and to engage in other outdoor activities with their pet are often required to secure the pet on a leash and thereafter to a stationary object. Traditional methods and devices used for tying a pet to a stationary object result in limited mobility of the pet because the leash, rope, or the like used to secure the pet becomes tangled or wrapped around the stationary object.

Other options for securing a pet outdoors include securing the pet to a stake or auger, providing an enclosure, or holding on to the pet's leash or rope. Stakes or augers secured in the ground are easily pulled out by the pet if not used properly; providing an enclosure such as a fence or pen is not always feasible or practical; and holding onto a leash or rope restrains activity of the pet owner as much as that of the pet.

The present invention comprises a leash ring which overcomes the foregoing and other difficulties which have long since characterized the prior art. In accordance with the broader aspects of the invention, a leash ring secures about a tree, pole or similar stationary object for rotation thereabout and comprises means for securing a leash thereto.

In accordance with a first embodiment of the invention a leash ring comprises opposed side members which are pivotally secured together by a threaded fastener at the proximal ends thereof, the threaded fastener further receiving a leash retaining member for pivotal movement with respect thereto. To close the leash ring, the side members are brought together until opposing teeth on the distal ends thereof mesh in rigid mating engagement. A locking pin is thereafter inserted into apertures extending through aligned bosses adjacent the opposed teeth thereby retaining the ring in its closed condition. Once secured around a tree or similar stationary object the leash ring rotates freely thereby enabling a pet secured thereto to move about freely without becoming entangled.

In accordance with other embodiments of the invention a leash ring comprises a semi-flexible, circularly shaped member that receives the loop handle of a pet leash and is thereafter extended around a tree or other stationary object. Locking members formed integrally with the circularly shaped member secure the leash ring in its closed condition.

BRIEF DESCRIPTION OF THE DRAWINGS

A more complete understanding of the present invention may be had by reference to the following Detailed Description when taken in connection with the accompanying Drawings, wherein.

DETAILED DESCRIPTION

Figure 1:
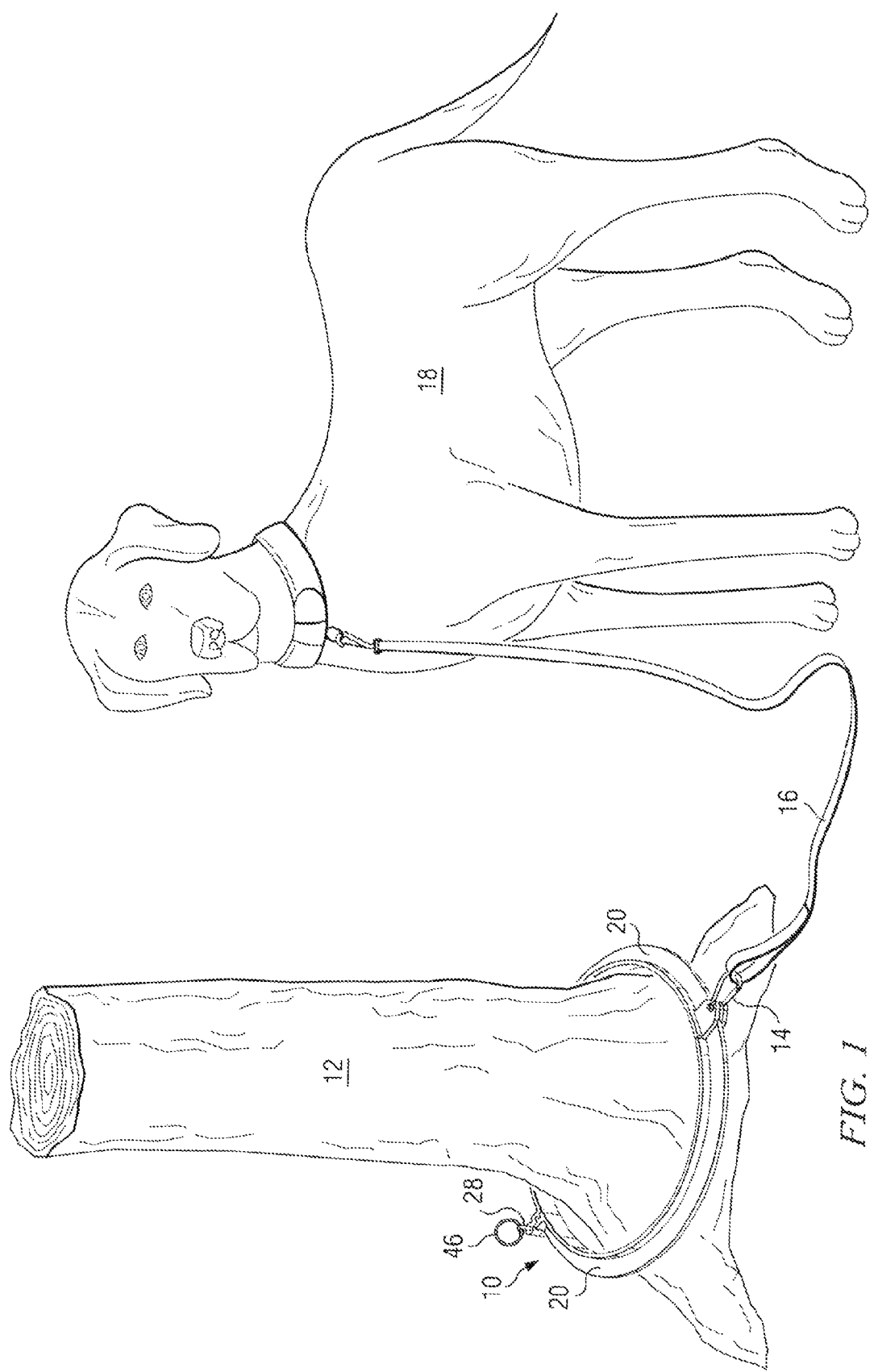
FIG. 1 is a perspective view of a leash ring comprising a first embodiment of the present invention having a dog secured thereto.
Figure 2:
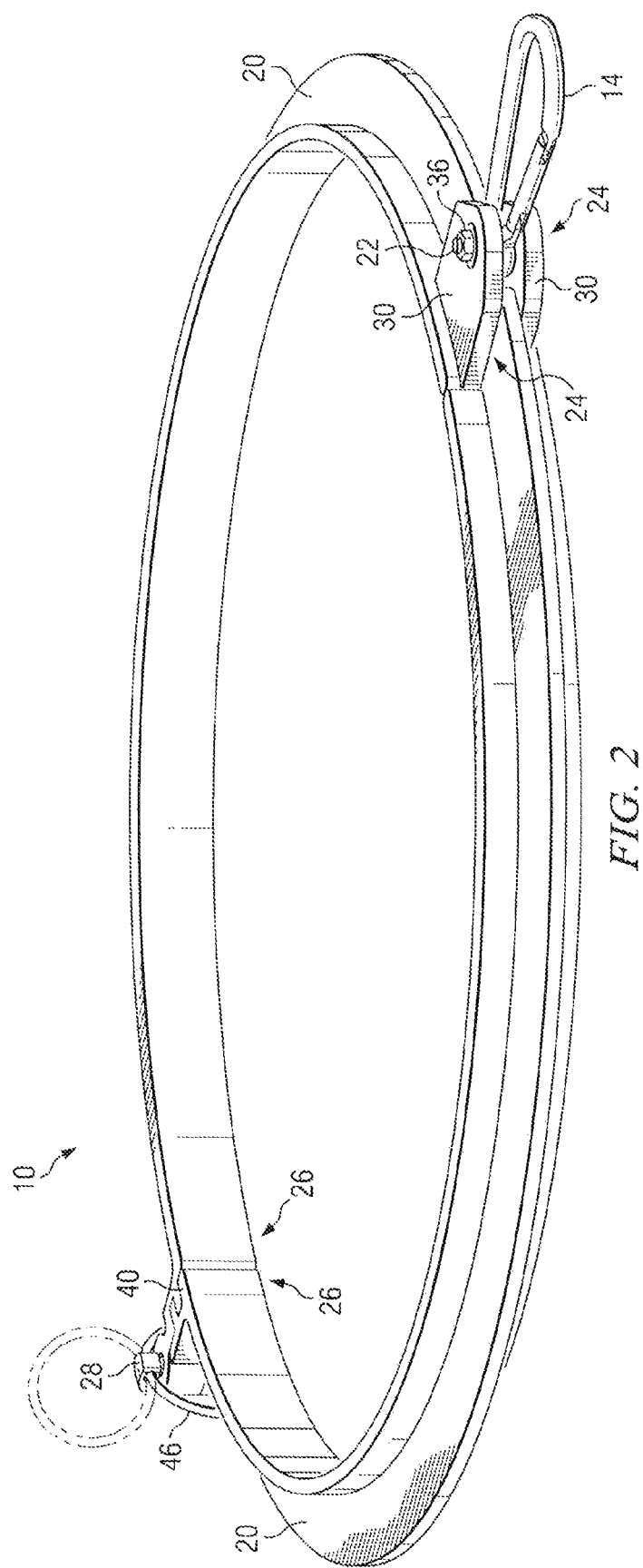
FIG. 2 is an enlarged perspective view of the leash ring shown in FIG. 1.

Referring now to the drawings and particularly to FIGS. 1 and 2 thereof, there is shown a leash ring 10 comprising a first embodiment of the present invention. The leash ring 10 closes and fastens about a tree 12 or other stationary object and comprises a leash receiving member 14 for receiving a leash 16 thereon. The ring 10 rotates freely about the tree 12 thereby enabling a dog 18 or other pet secured to the leash 16 to move freely without danger of the leash 16 becoming entangled or wrapped about the tree 12.

Referring particularly to FIG. 2, the leash ring 10 comprises opposed side members 20 which are pivotally secured one to the other by a threaded fastener 22 at the proximal ends 24 thereof. In addition to securing the side members 20 together the threaded fastener 22 receives the leash retaining member 14 for pivotal movement therearound.

To close the leash ring 10 the side members 20 are brought together until the distal ends 26 matingly engage with each other. A locking pin 28 is then inserted into the leash ring 10 for retaining the ring 10 in a closed position. The side members 20 may be fabricated from rigid materials such as plastics, metals, woods, or similar rigid load bearing materials known to those skilled in the art.

Figure 3:
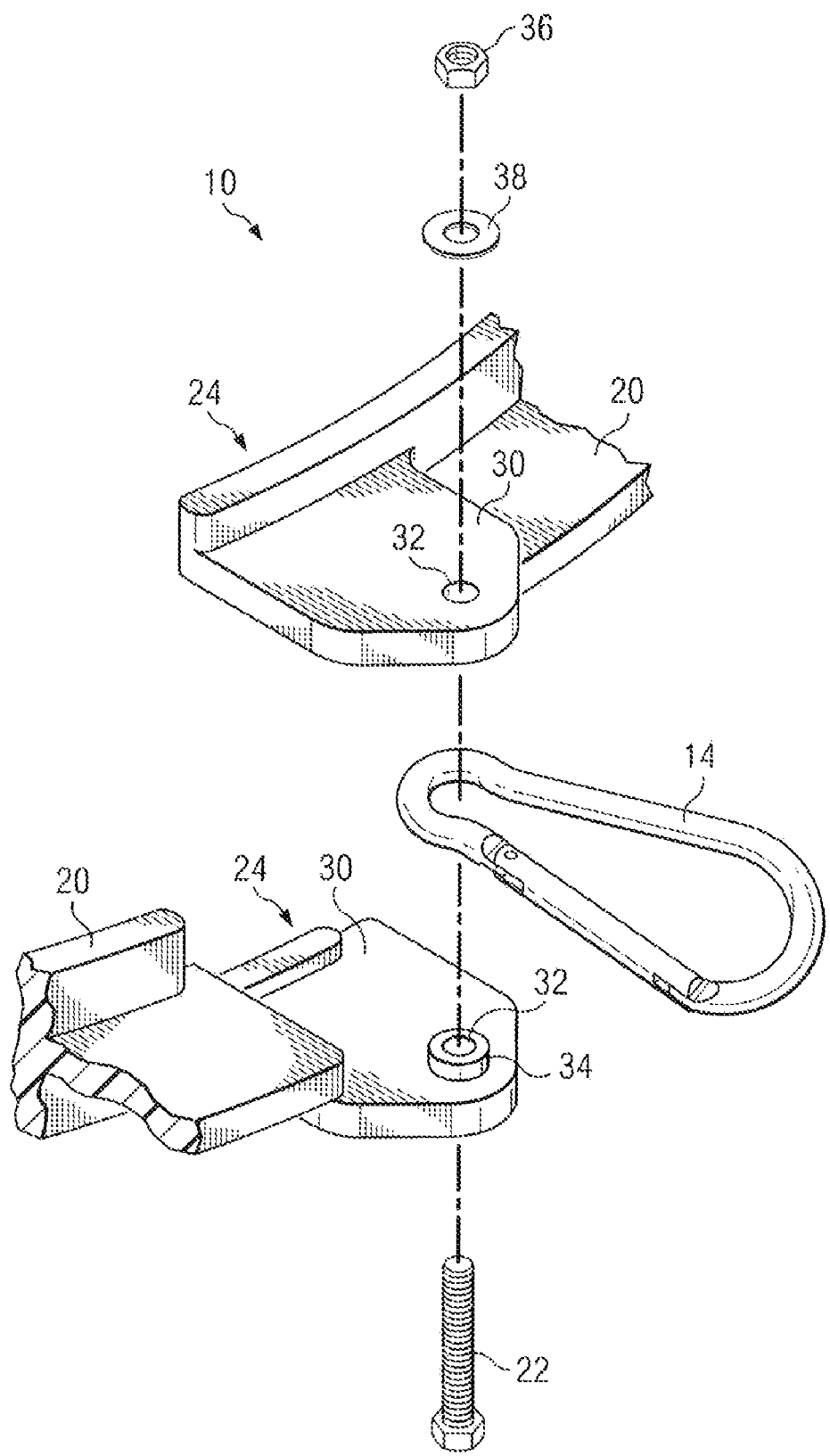
FIG. 3 is an exploded view of the proximal ends of side members comprising the leash ring shown in FIG. 1.

FIG. 3 comprises an enlarged, exploded view of the proximal ends 24 of the side members 20. Each side member 20 has a tab 30 at the proximal end thereof. Each tab has an aperture 32 formed therethrough for receiving the threaded fastener 22. The apertures 32 extend through bosses 34 comprising part of the corresponding tab 30. When the leash ring 10 is assembled the bosses 34 of the side members 20 rest in mating engagement with each other thereby receiving and retaining the leash receiving member 14 therearound. The threaded fastener 22 is secured utilizing a nut 36 and washer 38, the side members 20 being pivotally secured thereby. The leash receiving member 14 is a spring-loaded clevis similar to carabiners and "D" rings used in outdoor recreational sports such as mountain climbing and the like.

Figure 4:
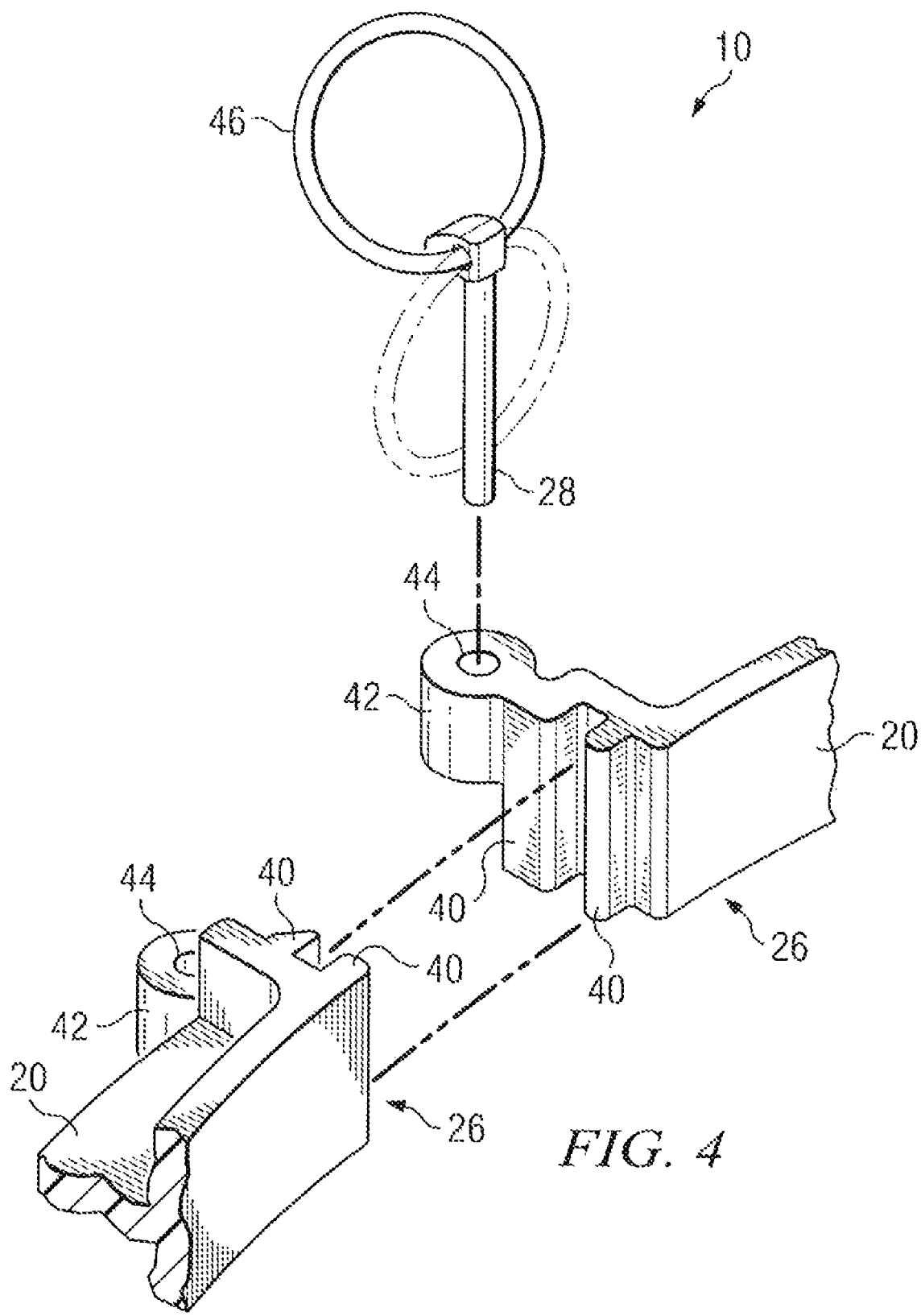
FIG. 4 is an exploded view of the distal ends of the side members comprising the leash ring shown in FIG. 1.

FIG. 4 comprises an enlarged, exploded view of the distal ends 26 of the side members 20 and the locking pin 28. The side members 20 comprise opposing teeth 40 at the distal ends 26 thereof. The opposing teeth 40 rigidly engage each other thereby securing the ring 10 in a closed condition. Protruding from each side member 20 adjacent to the opposing teeth 40 is a boss 42 having an aperture 44 therethrough. When the ring 10 is closed and the teeth 40 are engaged, the bosses 42 of the side members 20 are aligned for receiving the locking pin 28 therethrough. The locking pin 28 further comprises a ring 46 which folds over the aligned bosses 42 thereby maintaining the locking pin 28 in a secure position.

Referring again to FIG. 1, the leash ring 10 of the present invention is shown secured around a tree. However, the leash ring is equally applicable for use in conjunction with various stationary objects including but not limited to building posts, fence posts, table legs, fire hydrants, etc. The side members comprising the leash ring 10 of the present invention may comprise various colors or appearances including a solid color, a decorative design having paw prints incorporated therewith, various camouflage patterns, and other possibilities.

Figure 5:
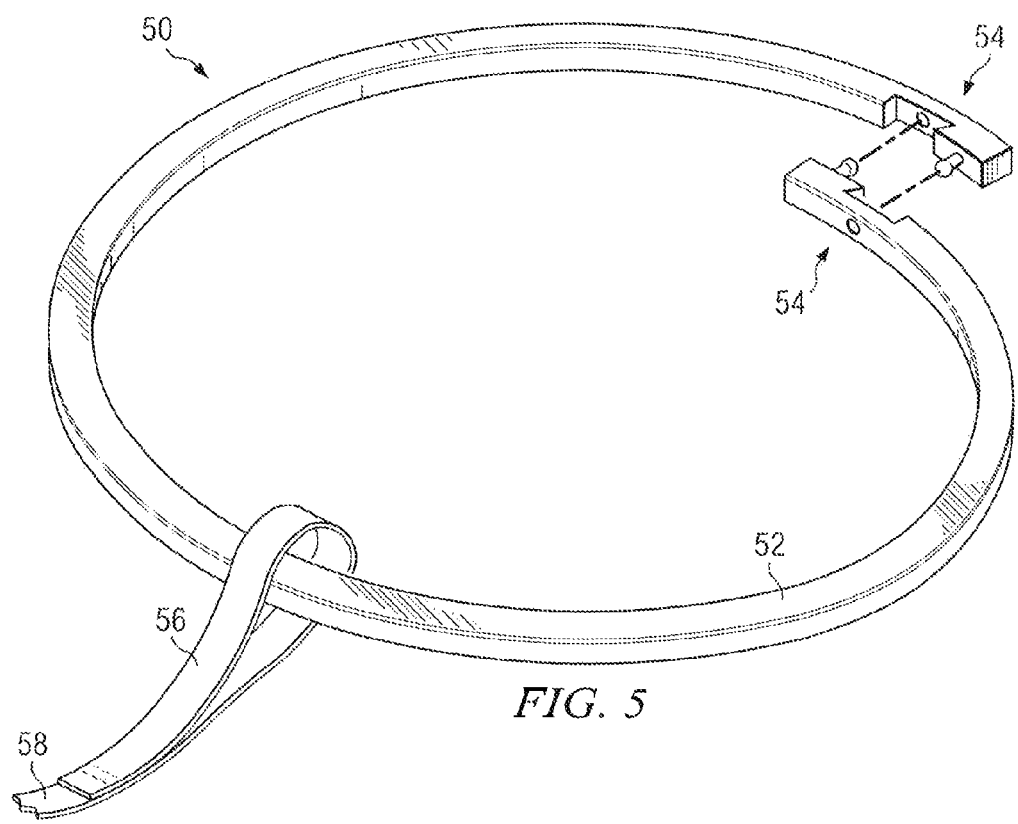
FIG. 5 is a perspective view illustrating a second embodiment of the invention.

A second embodiment of the invention is illustrated in FIG. 5. A leash ring 50 comprises a ring of flexible plastic material 52 comprising any of the wide variety of plastic materials utilized in the fabrication of industrial goods, commercial goods, household goods, etc. For example, the ring 50 may be manufactured from polyethylene, polystyrene, polyvinylchloride, etc. The only requirement pertaining to the manufacture of the ring 52 is that it be constructed from a material that is both flexible and resistant to elongation and to tearing.

The leash ring 50 comprises a unitary structure having latching members 54 at the opposite ends thereof. The latching members 54 are snap-type latching members which are engaged by pressing the latching members 54 at the opposite ends of the ring 50 into engagement with one another with sufficient force to achieve latching engagement. The latching members 54 are specifically designed to prevent disengagement therebetween responsive to an animal pulling against the restraint of the leash ring 50.

Utilization of the leash ring 50 begins by threading the loop handle 56 of a conventional leash 58 onto the ring 50. Thereafter the ring 52 is spread apart from the configuration shown in FIG. 5 sufficiently to receive a tree or other stationary object within the ring 52. Thereafter the latching members 54 are manipulated into engagement with one another and are pressed into latching engagement thereby securing the ring 50 around the stationary object and thereby restraining an animal that is secured to the leash 58.

Figure 6:
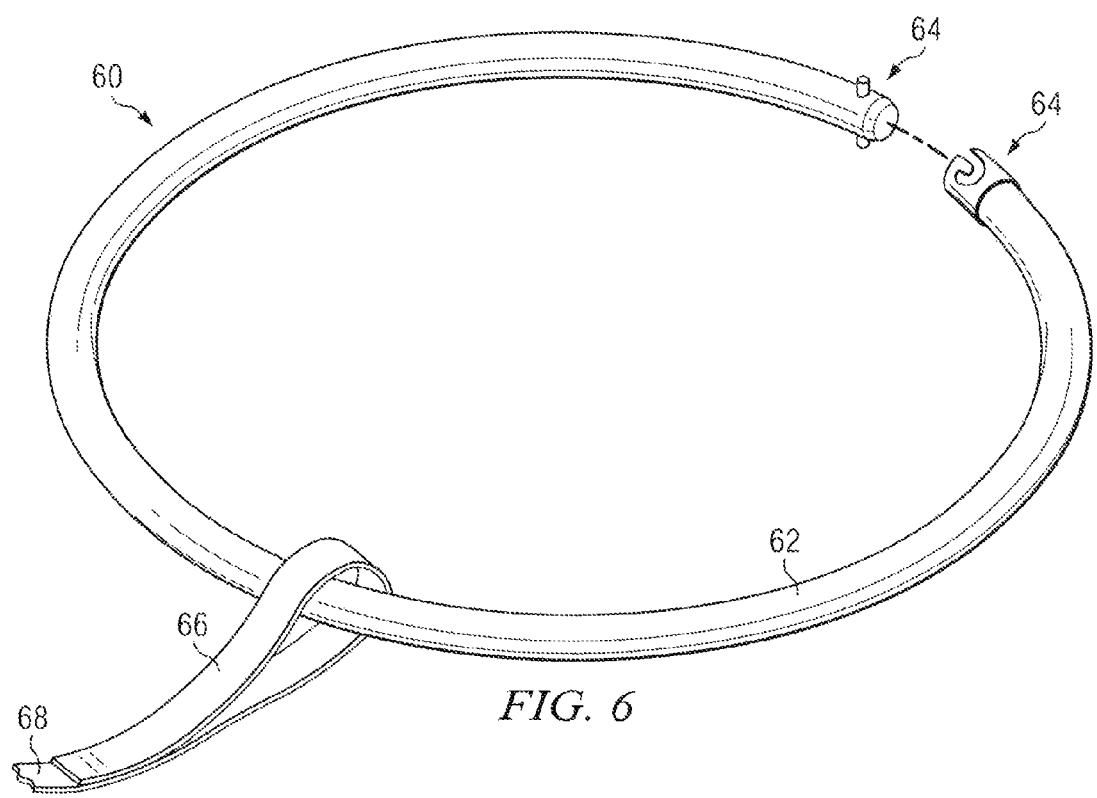
FIG. 6 is a perspective view illustrating a third embodiment of the invention.

A second embodiment of the invention is illustrated in FIG. 6. A leash ring 60 comprises a ring of flexible plastic material 62 comprising any of the wide variety of plastic materials utilized in the fabrication of industrial goods, commercial goods, household goods, etc. For example, the ring 60 may be manufactured from polyethylene, polystyrene, polyvinylchloride, etc. The only requirement pertaining to the manufacture of the ring 62 is that it be constructed from a material that is both flexible and resistant to elongation and to tearing.

The leash ring 60 comprises a unitary structure having latching members 64 at the opposite ends thereof. The latching members 64 are bayonet-type latching members which are engaged by twisting the latching members 64 at the opposite ends of the ring 60 until the latching members are aligned, engaging the latching members, and then releasing the latching members into latching engagement.

Utilization of the leash ring 60 begins by threading the loop handle 66 of a conventional leash 68 onto the ring 60. Thereafter the ring 62 is spread apart from the configuration shown in FIG. 6 sufficiently to receive a tree or other stationary object within the ring 60. Thereafter the latching members 64 are manipulated into engagement with one another and are released into latching engagement thereby securing the ring 60 around the stationary object and thereby restraining an animal that is secured to the leash 68.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. An apparatus for restraining a pet to a stationary object comprising:
   opposed side members;
   the side members being configured to surround a stationary object when secured one to another;
   means for pivotally securing the proximal ends of the side members to one another;
   the two side members forming an aperture therebetween when secured together at each end;
   means for locking the distal ends of the side members together;
   means for securing a pet tethering apparatus to at least one of the side members;
   the means for pivotally securing the proximal ends of the side members together comprising a threaded fastener;
   the threaded fastener also securing a spring loaded leash receiving member to the side members.

* * * * *